(12) United States Patent
Miyasako

(10) Patent No.: US 9,723,208 B2
(45) Date of Patent: Aug. 1, 2017

(54) IMAGE PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Kenichi Miyasako, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 23 days.

(21) Appl. No.: 14/749,066

(22) Filed: Jun. 24, 2015

(65) Prior Publication Data

US 2015/0381893 A1 Dec. 31, 2015

(30) Foreign Application Priority Data

Jun. 27, 2014 (JP) .................................. 2014-133246

(51) Int. Cl.
*H04N 5/232* (2006.01)

(52) U.S. Cl.
CPC ..... *H04N 5/23254* (2013.01); *H04N 5/23258* (2013.01); *H04N 5/23287* (2013.01)

(58) Field of Classification Search
CPC ........... H04N 5/23254; H04N 5/23258; H04N 5/23287
See application file for complete search history.

(56) References Cited

U.S. PATENT DOCUMENTS

| | | | |
|---|---|---|---|
| 2005/0219374 A1* | 10/2005 | Uenaka | G02B 27/646 348/208.12 |
| 2007/0115364 A1 | 5/2007 | Kumaki | |
| 2011/0158619 A1* | 6/2011 | Kanayama | G02B 27/646 396/55 |
| 2012/0033091 A1* | 2/2012 | Miyasako | H04N 5/23254 348/208.1 |
| 2012/0092511 A1 | 4/2012 | Wakamatsu | |

(Continued)

FOREIGN PATENT DOCUMENTS

| | | |
|---|---|---|
| GB | 2528382 A | 1/2016 |
| JP | 2005-203861 A | 7/2005 |
| JP | 2010-252078 A | 11/2010 |

OTHER PUBLICATIONS

Apr. 6, 2016 European Search Report, that issued in the corresponding U.K. Patent Application No. 1603183.3.

(Continued)

*Primary Examiner* — Christopher K Peterson
(74) *Attorney, Agent, or Firm* — Cowan, Liebowitz & Latman, P.C.

(57) ABSTRACT

An image processing apparatus comprises a first calculation unit for calculating a shake correction amount for a moving image by using a shake signal output from shake detection unit, a second calculation unit for calculating a shake correction amount for a still image by using a shake signal output from the shake detection unit, a generation unit for generating, based on a comparison result between the shake correction amount for the moving image and the shake correction amount for the still image, evaluation values serving as indices used for extracting a still image from among frame images of the moving image, and a recording unit for recording the evaluation values in association with the frame images of the moving image.

6 Claims, 12 Drawing Sheets

(56) References Cited

U.S. PATENT DOCUMENTS

2013/0034345 A1* 2/2013 Miyahara .......... H04N 5/23258
396/55
2013/0044228 A1* 2/2013 Corey ................ H04N 5/23254
348/208.2

OTHER PUBLICATIONS

A Nov. 15, 2015 Great Britain Search Report, that issued in GB1510614.9.

* cited by examiner

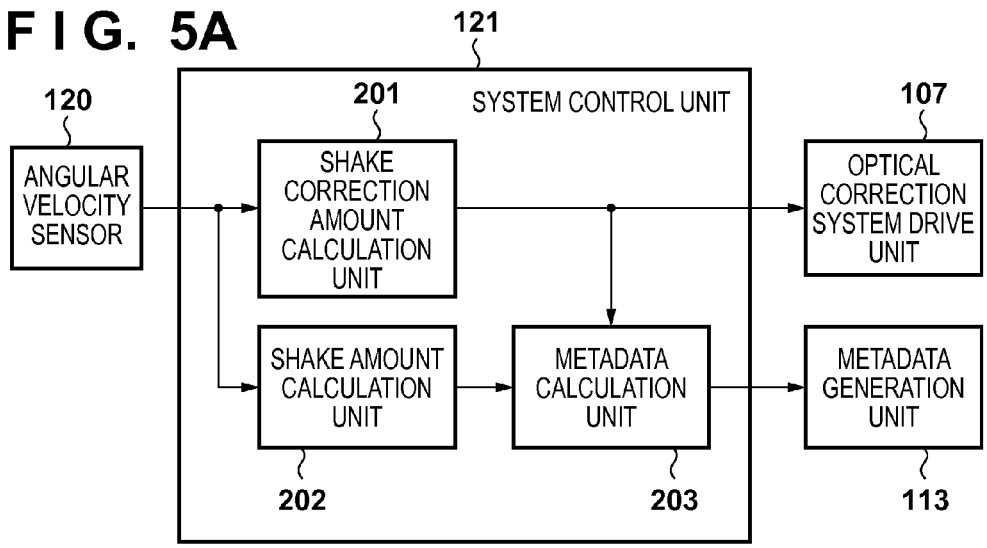
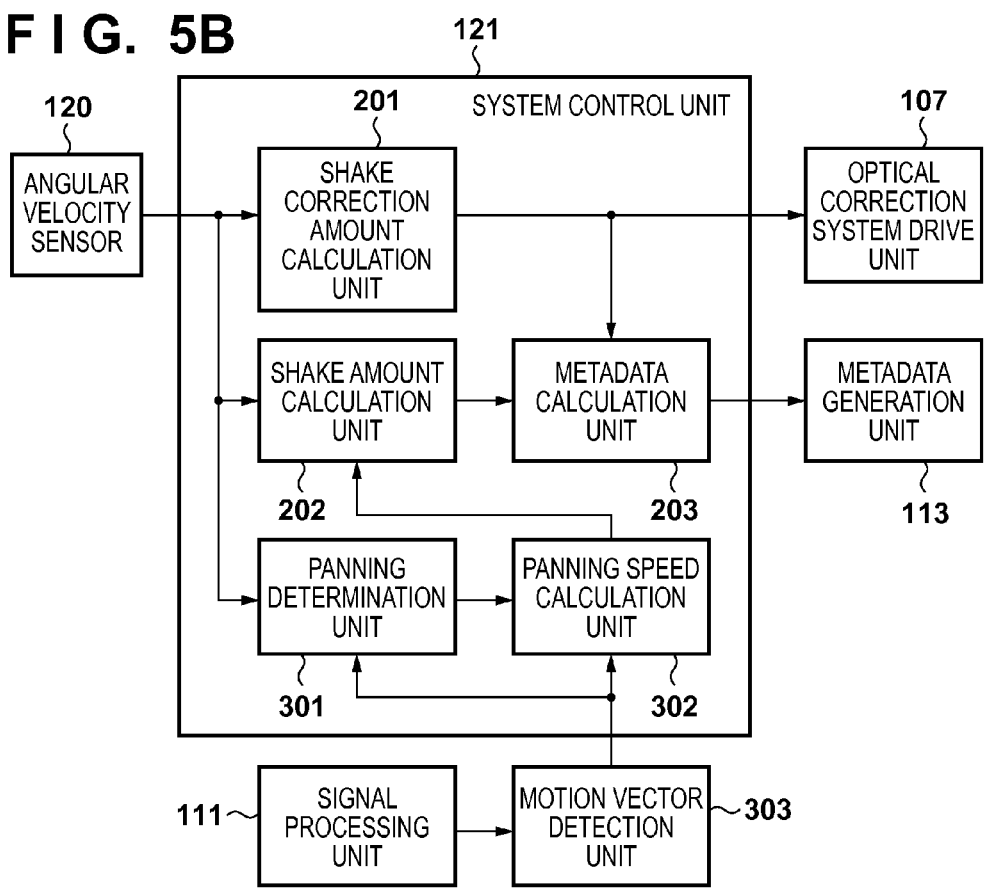

F I G. 9A
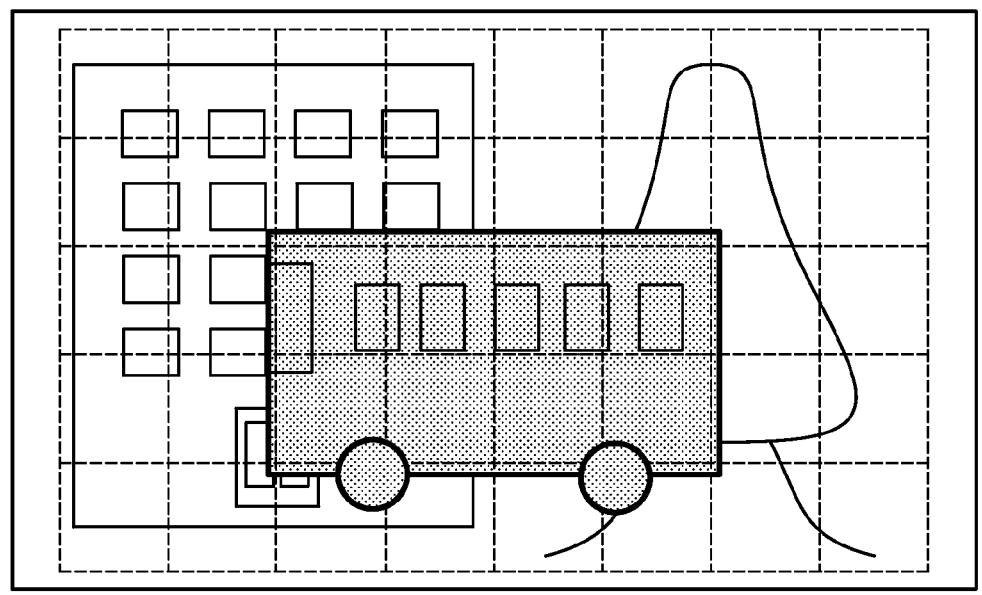
F I G. 9B
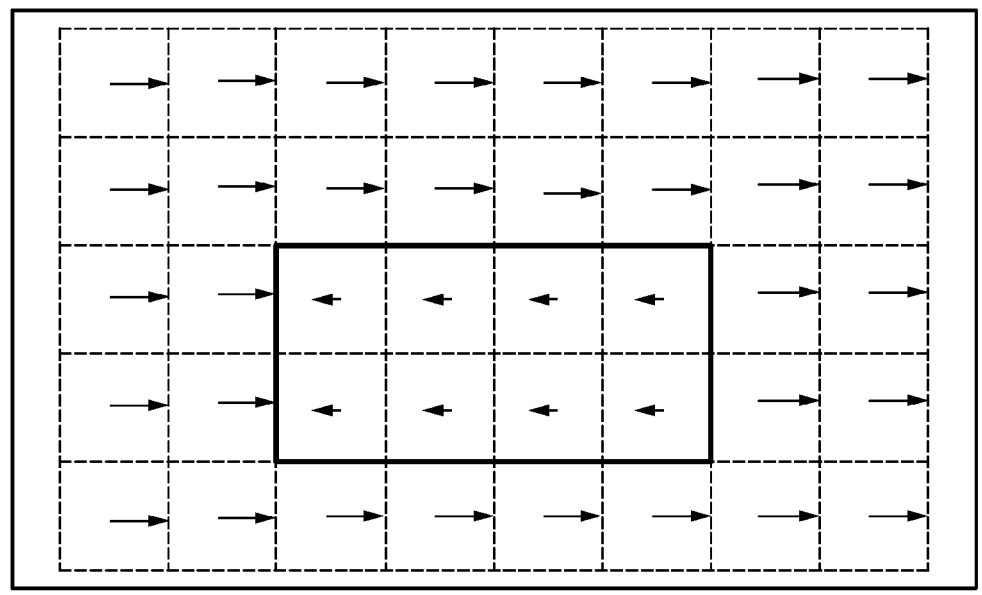

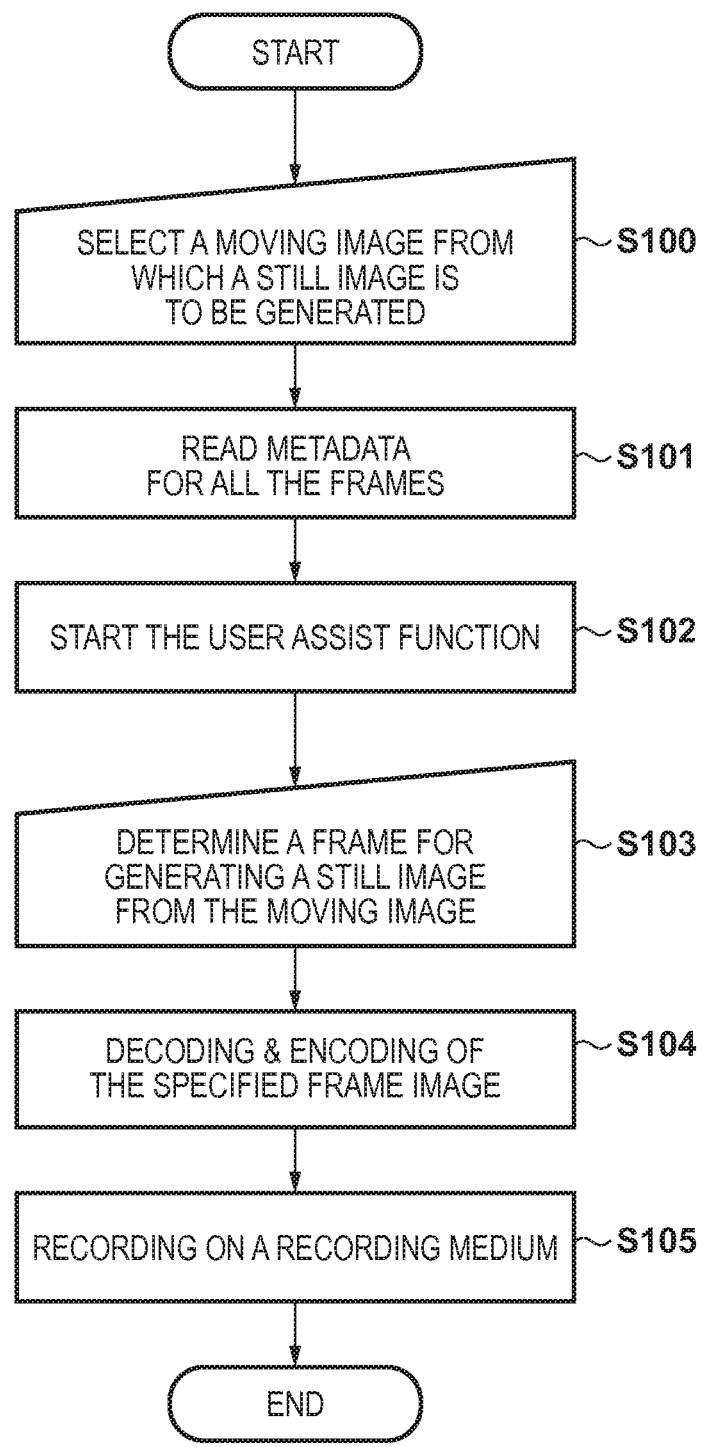

IMAGE PROCESSING APPARATUS, METHOD FOR CONTROLLING THE SAME, AND STORAGE MEDIUM

BACKGROUND OF THE INVENTION

Field of the Invention

The present invention relates to the technology of generating a still image from a moving image that has been captured.

Description of the Related Art

In recent years, there has been a rapid increase in the number of pixels in image capturing apparatuses that are capable of capturing a moving image. Image capturing apparatuses that are capable of capturing a Full HD moving image have already become common, and image capturing apparatuses that are capable of capturing a 4K or 2K moving image are also emerging on the market now.

Due to the development of such a high-definition moving image, each frame image of a moving image in recent years has a sufficient number of pixels for use as a still image. Accordingly, it is expected that a method for generating a still image from the frames of a moving image will be more common in the future.

One problem in generating a still image from a moving image is that it is difficult for a user to determine which frame image is the most suitable as a still image. For example, camera shake or an out-of-focus image, which are not noticed because of the continuous transition between frames when the image is viewed as a part of a moving image, are often beyond the acceptable level when the image is viewed as a still image. To check the frames one by one is very troublesome for the user.

To address such a problem, Japanese Patent Laid-Open No. 2010-252078 discloses the following method: First, camera image status information, which has been recorded during recording of a moving image, is read during playback of the moving image. Then, an image that is the most suitable as a still image is selected from among frames captured around the time when the switch for recording a still image is pressed down.

However, although the conventional example above discloses a concept of recording the status information on AF, AE, AWB, shake, etc. in synchronization with the recording of a moving image so that the status information can be used for selecting a still image during playback of the moving image, this example does not contain any specific disclosure about how to generate the status information.

SUMMARY OF THE INVENTION

The present invention is made in view of the above-described problem, and provides an image processing apparatus that allows the user to easily select an image that is the most suitable as a still image from among images constituting a moving image that has been captured.

According to the first aspect of the present invention, there is provided an image processing apparatus comprising: a first calculation unit configured to calculate a shake correction amount for a moving image by using a shake signal output from a shake detection unit; a second calculation unit configured to calculate a shake correction amount for a still image by using a shake signal output from the shake detection unit; a generation unit configured to generate, based on a comparison result between the shake correction amount for the moving image and the shake correction amount for the still image, evaluation values serving as indices used for extracting a still image from among frame images of the moving image; and a recording unit configured to record the evaluation values in association with the frame images of the moving image.

According to the second aspect of the present invention, there is provided an image processing apparatus comprising: a first calculation unit configured to calculate a shake correction amount for a moving image by using a shake signal output from shake detection unit; a second calculation unit configured to calculate a shake correction amount achieving a higher anti-shake performance than the shake correction amount for the moving image, by using a shake signal output from the shake detection unit; a generation unit configured to generate, based on a comparison result between the shake correction amount for the moving image and the shake correction amount achieving a higher anti-shake performance than the shake correction amount for the moving image, evaluation values serving as indices used for extracting a still image from among frame images of the moving image; and a recording unit configured to record the evaluation values in association with the frame images of the moving image.

According to the third aspect of the present invention, there is provided a method for controlling an image processing apparatus, comprising: a first calculation step of calculating a shake correction amount for a moving image by using a shake signal output from shake detection unit; a second calculation step of calculating a shake correction amount for a still image by using a shake signal output from the shake detection unit; a generation step of generating, based on a comparison result between the shake correction amount for the moving image and the shake correction amount for the still image, evaluation values serving as indices used for extracting a still image from among frame images of the moving image; and a recording step of recording the evaluation values in association with the frame images of the moving image.

According to the fourth aspect of the present invention, there is provided a method for controlling an image processing apparatus, comprising: a first calculation step of calculating a shake correction amount for a moving image by using a shake signal output from shake detection unit; a second calculation step of calculating a shake correction amount achieving a higher anti-shake performance than the shake correction amount for the moving image, by using a shake signal output from the shake detection unit; a generation step of generating, based on a comparison result between the shake correction amount for the moving image and the shake correction amount achieving a higher anti-shake performance than the shake correction amount for the moving image, evaluation values serving as indices used for extracting a still image from among frame images of the moving image; and a recording step of recording the evaluation values in association with the frame images of the moving image.

Further features of the present invention will become apparent from the following description of exemplary embodiments with reference to the attached drawings.

BRIEF DESCRIPTION OF THE DRAWINGS

FIGS. 5A and 5B are block diagrams showing configurations for calculating shake metadata.

FIGS. 9A and 9B are diagrams illustrating a method of calculating panning speed.

FIG. 11 is a flowchart for generating a still image from a moving image by using metadata.

DESCRIPTION OF THE EMBODIMENTS

Figure 1:
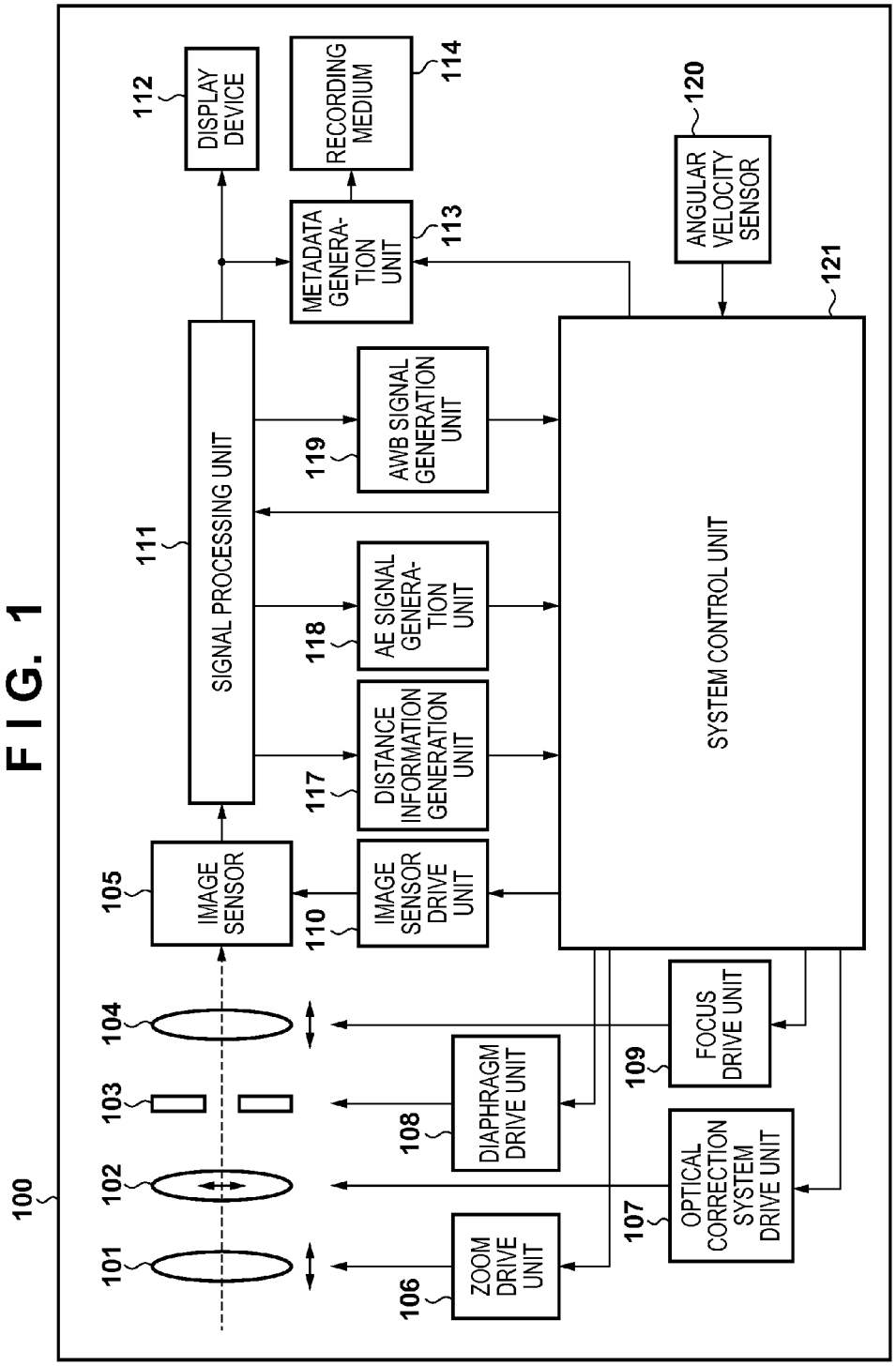
FIG. 1 is a block diagram showing a configuration of a video camera as an embodiment of the image capturing apparatus according to the present invention.

The following provides a detailed description of an embodiment of the present invention, with reference to the accompanying drawings. FIG. 1 is a block diagram showing a configuration of a video camera capable of capturing a moving image, which is an embodiment of the image capturing apparatus according to the present invention. FIG. 1 shows the functional blocks of the image capturing apparatus, each used for capturing of a moving image. With reference to FIG. 1, the following provides a specific description of a configuration of an image capturing apparatus 100 and its operations during capturing of a moving image.

In FIG. 1, the image capturing apparatus 100 includes a variable magnification lens 101, an optical correction system 102, a diaphragm 103, and a focus lens 104, which are arranged along the direction of the optical axis. These elements and other optical systems not shown in the drawing constitute an optical image capturing system.

The variable magnification lens 101 is a lens that changes the magnification rate by moving along the direction of the optical axis. The focus lens 104 is a lens that has the function of correcting the movement of the focal plane along with the magnification change, as well as the function of focusing. The diaphragm 103 is, for example, an iris diaphragm for adjusting the amount of incident light.

An image sensor 105 is disposed behind the focus lens 104. The image sensor 105 captures an image of the object by photoelectric conversion. The image sensor 105 is configured as an XY address type complementary metal oxide semiconductor (CMOS) image sensor, for example. The signal resulting from the photoelectric conversion by the image sensor 105 is converted within the image sensor 105 to a digital signal, and the signal is then provided to a signal processing unit 111. The signal processing unit 111 performs various kinds of signal processing such as gamma correction and color correction, on image information output from the image sensor 105.

A system control unit 121 controls the entire image capturing apparatus 100. For example, the system control unit 121 performs various kinds of calculation processing in response to receiving information of a luminance value, color, etc. from the signal processing unit 111. The details of the control performed by the system control unit 121 will be described later.

A zoom drive unit 106 is a drive source for moving the variable magnification lens 101, and performs a zooming operation according to an instruction from the system control unit 121. The system control unit 121 sends an instruction to the zoom drive unit 106 according to an operation made by the user on a zoom operation unit not shown in the drawing.

A focus drive unit 109 is a drive source for moving the focus lens 104, and performs the driving according to an instruction from the system control unit 121. The system control unit 121 determines the drive position of the focus lens 104 according to a signal provided from a distance information generation unit 117. The distance information generation unit 117 generates distance information indicating the distance between the image capturing apparatus 100 and the object, by using the result of the signal processing performed by the signal processing unit 111 on the image signal acquired by the image sensor 105. The distance information may be generated by a known method such as a method in which a phase difference AF is performed by using a plurality of pixels on the image sensor 105. Alternatively, the distance information may be generated by using a distance information acquiring apparatus such as a sensor dedicated to performing a phase difference AF, or an IR sensor.

A diaphragm drive unit 108 is a drive source for driving the diaphragm 103 and adjusting the amount of incident light to the image sensor 105, and performs the driving according to an instruction from the system control unit 121. An image sensor drive unit 110 provides the image sensor 105 with, for example, a drive pulse for driving the image sensor 105, according to an instruction from the system control unit 121, and performs, for example, reading of electric charge accumulated in the image sensor 105 and adjustment of the exposure time, i.e., the shutter speed. The image sensor 105, usually upon application of a shutter pulse, performs an electronic shutter operation by which signal electric charge accumulated in the pixels is removed, and electric charge resulting from photoelectric conversion of an optical image is accumulated therein during the period until the next reading. The length of this period for accumulation is the aforementioned shutter speed. When an appropriate shutter speed cannot be set due to a low luminance level of the object, non-optimum exposure caused by lack of light is corrected by a level adjustment, i.e., a gain adjustment, of the image signal output from the image sensor 105.

An AE signal generation unit 118 calculates a light value corresponding to the brightness of the object by performing calculation processing including mainly a calculation of a cumulative sum of digital signals for the respective pixels, and provides the system control unit 121 with the light value. The system control unit 121 drives the diaphragm drive unit 108 and the image sensor drive unit 110 according to the light value generated by the AE signal generation unit 118, sets the aperture of the diaphragm 103, the shutter speed, and the gain of the image sensor 105, and controls the exposure.

An AWB signal generation unit 119 converts each of the R/G/B pixel signals, which are provided from the image sensor 105 to the signal processing unit 111, into a luminance signal Y and a color difference signal (R−Y, B−Y). The AWB signal generation unit 119 generates an AWB signal by first determining whether the color of each pixel is an achromatic color or not by using the black body radiation curve as a reference, and then calculating the mean value of the sum of the color difference signals of all the pixels determined to be pixels having an achromatic color. The signal processing unit 111 has a circuitry block that is capable of applying a different gain to each of the colors of RGB, and the system control unit 121 performs a white balance control based on the aforementioned AWB signal, in order for the color of white of the image data output from the image sensor 105 to be displayed correctly.

The optical correction system 102 is a correction system allowing for optical image stabilization, and it is moved in the direction perpendicular to the optical axis so as to tilt the optical axis. An optical correction system drive unit 107 is a drive source for moving the optical correction system 102, and performs driving according to an instruction from the system control unit 121. An angular velocity sensor 120 detects shake of the image capturing apparatus 100, thereby generating an angular velocity signal, and provides the system control unit 121 with the angular velocity signal. The system control unit 121 generates a control signal for the optical correction system drive unit 107 according to the angular velocity signal above, in order to move the optical correction system 102 and correct the motion of the image of the object on the imaging sensing plane. As a result, an image is formed on the image sensor 105 after the correction of the motion of the image of the object on the image sensing plane caused by shake of the apparatus for example. Optionally, the optical correction system 102 may be replaced with a structure for moving the image sensor 105 relative to the optical image capturing system, in the direction perpendicular to the optical axis.

A metadata generation unit 113 generates predefined metadata indicating the capturing condition of the captured image based on data provided from the system control unit 121, and records the metadata on a recording medium 114 in association with moving image data output from the signal processing unit 111. The details of the metadata handled by the metadata generation unit 113 will be described later. The recording medium 114 is an information recording medium such as a magnetic recording medium (e.g., a hard disk) or a semiconductor memory. A display device 112, using a liquid crystal display (LCD) for example, displays an image output from the signal processing unit 111.

Next, a detailed description is given of the method of calculating the metadata provided to the metadata generation unit 113. Four types of metadata, namely focus, exposure, white balance (WB), and shake, are obtained by calculation performed within the system control unit 121, and they are provided to the metadata generation unit 113. In the case of capturing a still image, these control parameters are set so as to follow their respective control target values calculated during the exposure, while keeping errors to a minimum. In the case of capturing a moving image, a rapid change in these control parameters causes a sudden change in the moving image, which results in an unnatural view. For this reason, it is common that control is performed for gradually changing the parameters toward the control target values. Using the method described below, metadata generation unit 113 calculates metadata about the differences occurring in such a process between the optimum control target values for a still image and actual setting values for achieving a natural view of a moving image, and records the metadata on the recording medium 114 in association with the moving image data.

Figure 2A:
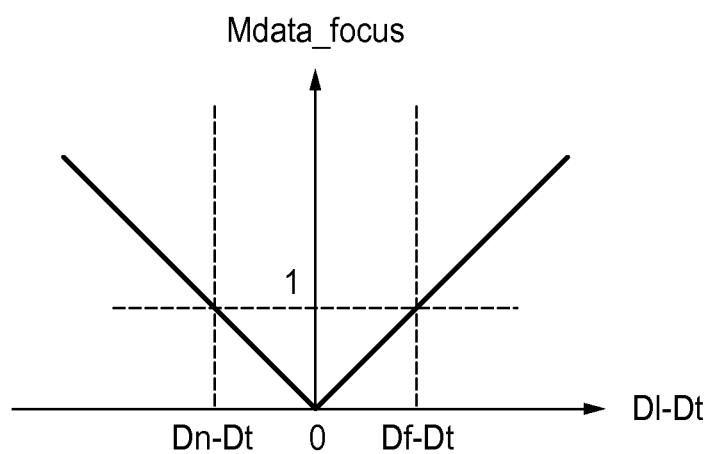
FIGS. 2A and 2B are diagrams illustrating an example of a method of calculating focus metadata.
Figure 2B:
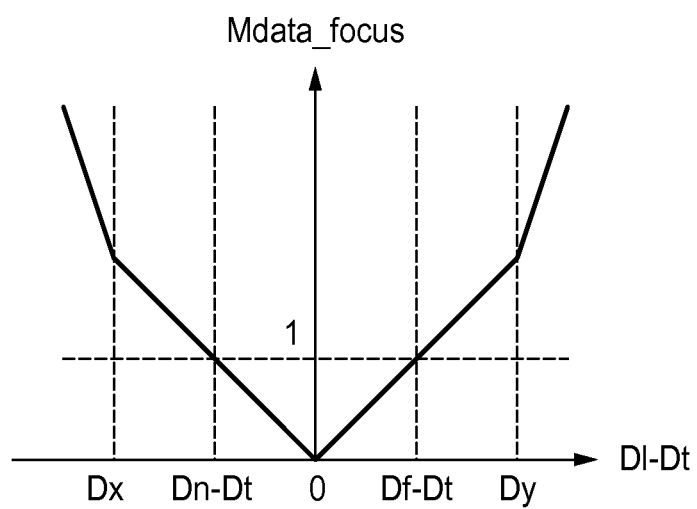

The following provides a detailed description of a method of generating focus metadata, with reference to FIGS. 2A and 2B. For the sake of simplification of the description, symbols are defined as follows.

Dt . . . Object's distance detected by the distance information generation unit 117

Dl . . . Captured-object's distance determined by the position of the focus lens 104

Df . . . Depth of field (on the infinity side)

Dn . . . Depth of field (on the closest side)

FIG. 2A shows an example of a graph in which the horizontal axis represents Dl−Dt, which is the difference between the object's distance as the target and the captured-object's distance determined by the position of the focus lens 104, and the vertical axis represents metadata Mdata_focus to be generated. Dl−Dt=0 expresses the perfect in-focus state, and Mdata_focus=0 is satisfied in such a state. In FIG. 2A, Mdata_focus is calculated by the following formulas:

$$\text{Mdata\_focus} = |(Dl-Dt)/(Df-Dt)|$$

where $Dl-Dt \geq 0$ $$\text{Mdata\_focus} = |(Dl-Dt)/(Dn-Dt)|$$

where $Dl-Dt < 0$

That is, the deviation of the captured-object's distance from the target value is normalized with respect to the range of the depth of field. As a result, Mdata_focus will be data having the following characteristics: the accuracy of focus increases as Mdata_focus approaches 0; and the degree of out-of-focus increases as Mdata_focus increases from 1.

FIG. 2B is a graph showing an example of another method of calculating Mdata_focus, in which the horizontal axis and the vertical axis represent the same as in FIG. 2A. In FIG. 2B, Mdata_focus is calculated in the same manner as in FIG. 2A when Dx<(Dl−Dt)<Dy is satisfied, but otherwise the amount of a change (gain) in Mdata_focus along with a change in Dl−Dt is greater than in FIG. 2A. This is for the following reason. An image that is only slightly out of focus can easily be corrected by contour enhancement or the like by image processing performed within the image capturing apparatus 100 or performed by using image processing software on a PC, for example. However, when contour enhancement is performed on an image that is significantly out of focus, the pseudo contour or the like will be noticeable, and the degree of deterioration in quality of the image as a still image will be significant.

Figure 3A:
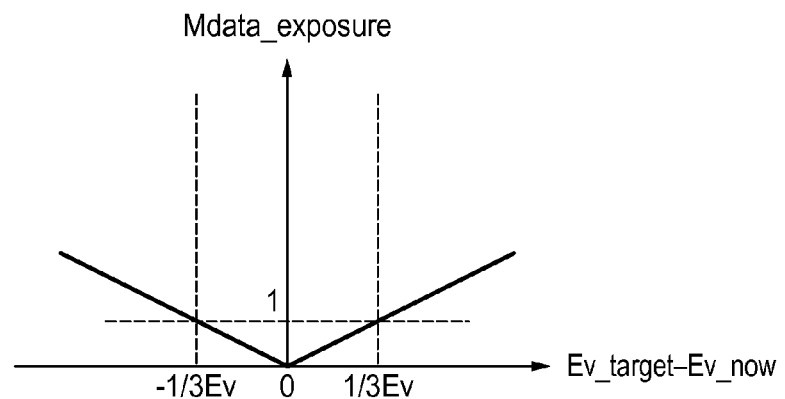
FIGS. 3A to 3C are diagrams illustrating an example of a method of calculating exposure metadata.
Figure 3B:
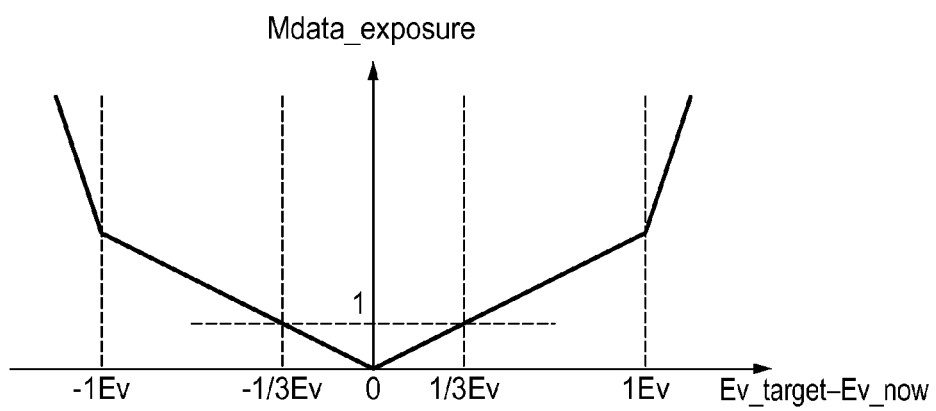
Figure 3C:
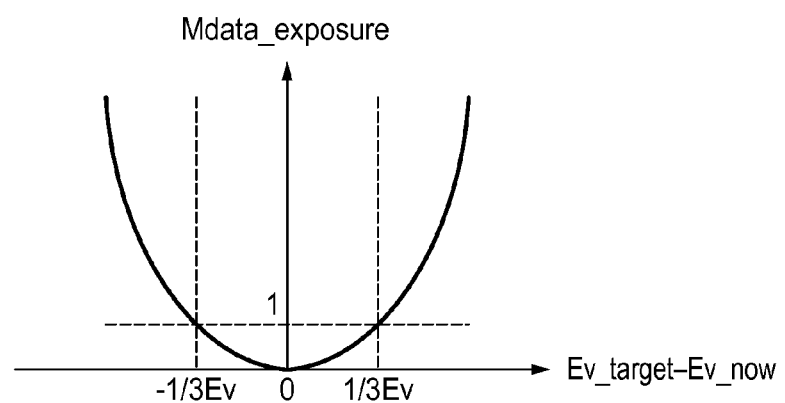

The following provides a detailed description of a method of generating exposure metadata, with reference to FIGS. 3A to 3C. In each of the graphs shown in FIGS. 3A to 3C, the horizontal axis is expressed in the unit according to the additive system of photographic exposure (APEX). The symbols are defined as follows:

Ev_now . . . Exposure determined by the current aperture and shutter speed

Ev_target . . . Optimum exposure determined by the output from the AE signal generation unit 118

FIG. 3A shows an example of a graph in which the horizontal axis represents Ev_target−Ev_now, which is the difference between the optimum exposure and the current exposure, and the vertical axis represents Mdata_exposure to be generated. Regarding the horizontal axis, a positive value expresses overexposure, a negative value expresses underexposure, and 0 expresses the correct exposure. The correct exposure corresponds to Mdata_exposure=0. In FIG. 3A, Mdata_exposure is calculated by the following formula:

$$\text{Mdata\_exposure} = |Ev\_target - Ev\_now|/(\tfrac{1}{3})$$

That is, the deviation of the current exposure from the optimum exposure is normalized with respect to a predetermined Ev value (⅓Ev in this example). Note that normalization with respect to ⅓Ev is merely an example. This value may be set by a user freely, or may vary according to the luminance distribution of the object. For example, when a shift by ⅓Ev causes highlight-detail loss or shadow-detail loss, another method may be adopted, such as normalization with respect to ⅕Ev. As a result of this calculation, Mdata_exposure will be data having the following characteristics: the degree of the correctness of the exposure increases as Mdata_exposure approaches 0; and the degree of underexposure or overexposure increases as Mdata_exposure increases from 1.

FIG. 3B is a graph showing an example of another method of calculating Mdata_exposure, in which the horizontal axis and the vertical axis represent the same as in FIG. 3A. In FIG. 3B, Mdata_exposure is calculated in the same manner as in FIG. 3A when −1<(Ev_target−Ev_now)<1 is satisfied, but otherwise the amount of a change (gain) in Mdata_exposure along with a change in Ev_target−Ev_now is greater than in FIG. 3A. This is for the following reason. An exposure that slightly deviates from the optimum exposure can easily be corrected by adjusting the luminance level of the image by image processing performed within the image capturing apparatus 100 or performed by using image processing software on a PC, for example. However, when the exposure of an image significantly deviates from the optimum exposure, the degree of deterioration in quality of the image as a still image will be significant. For example, highlight-detail loss and shadow-detail loss cannot be corrected, or noises are noticeable even after correction.

FIG. 3C is a graph showing an example of another method of calculating Mdata_exposure, in which the horizontal axis and the vertical axis represent the same as in FIGS. 3A and 3B. In FIG. 3C, Mdata_exposure is calculated by the following formula:

$$\text{Mdata\_exposure} = (2^{(|Ev\_target - Ev\_now|) - 1)} - 1)/(2^{(1/3)} - 1)$$

The Ev value is a value according to the unit system for measuring the amount of incident light to the image sensor, and it is expressed in the form of a logarithm to base 2. In other words, when the Ev value changes by 1, the amount of light will be doubled or halved. In the above formula, normalization is performed after converting the value in the unit according to the APEX system to a value in the unit for an actual amount of light, and hence the amount of the deviation from the optimum exposure can be more accurately expressed by the metadata Mdata_exposure.

Figure 4A:
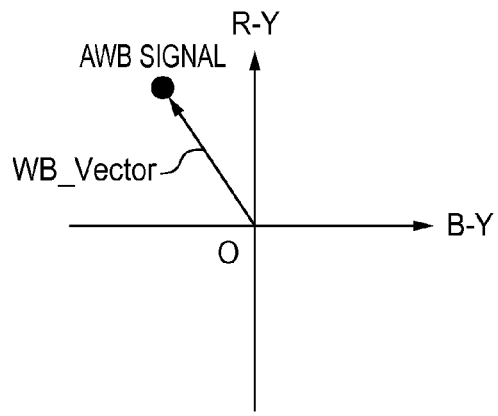
FIGS. 4A to 4C are diagrams illustrating an example of a method of calculating white balance metadata.
Figure 4B:
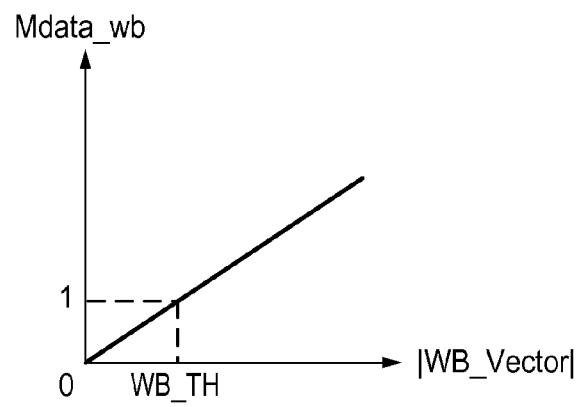
Figure 4C:
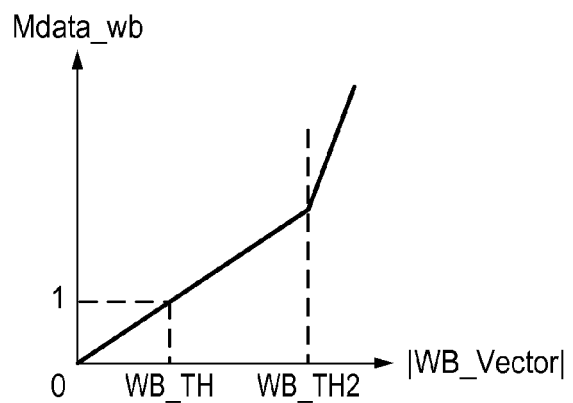

The following provides a detailed description of a method of generating white balance metadata, with reference to FIGS. 4A to 4C. The graph shown in FIG. 4A has the coordinate axes representing the color differences R−Y and B−Y. If the coordinate point of the above-described AWB signal is close to the origin O in FIG. 4A, it means that RGB are well-balanced, i.e., the white balance is optimum. On the other hand, the more the coordinate point is separated from the origin O, the more the white balance deviates from the optimum value. The vector of the AWB signal on the coordinate system shown in FIG. 4A is defined as WB_Vector.

FIG. 4B and FIG. 4C show examples of graphs in each of which the horizontal axis represents the magnitude of WB_Vector and the vertical axis represents the metadata Mdata_wb. As described above, a larger value of the horizontal axis means a larger deviation from the optimum white balance of the image. In FIG. 4B, Mdata_wb is calculated by the following formula:

$$\text{Mdata\_wb} = |WB\_Vector|/WB\_TH$$

That is, the amount of the deviation from the optimum value of the white balance is normalized with respect to a predetermined threshold value WB_TH. Here, WB_TH is defined as the permissible value of the amount of the deviation from the optimum white balance. Since the permissible value of the amount of the color deviation varies widely from person to person and it is difficult to fixedly determine the permissible value, the permissible value may be set by a user freely. In addition, depending on the properties of the light source, the convergence to the origin cannot be feasible in some cases, and in such cases, the threshold WB_TH may be increased, or the origin in FIG. 4A may be shifted according to the properties of the light source. As a result of this calculation, Mdata_wb will be data having the following characteristics: the degree of the correctness of the white balance increases as Mdata_wb approaches 0; and the deviation from the optimum white balance increases as Mdata_wb increases from 1.

FIG. 4C is a graph showing an example of another method of calculating Mdata_wb, in which the horizontal axis and the vertical axis represent the same as in FIG. 4B. In FIG. 4C, Mdata_wb is calculated in the same manner as in FIG. 4B when |WB_Vector|<WB_TH2 is satisfied, but otherwise the amount of a change (gain) in Mdata_wb along with a change in |WB_Vector| is greater than in FIG. 4B. This is for the following reason. A small color deviation can easily be corrected by adjusting the color level of the image by image processing performed within the image capturing apparatus 100 or performed by using image processing software on a PC, for example. However, when a color deviation of an image is large, the degree of deterioration in quality of the image as a still image will be significant. For example, noises will be noticeable.

The following provides a detailed description of a method of generating image shake metadata, with reference to FIG. 5A to FIG. 10C. FIG. 5A is an example of a block diagram for generating image shake metadata. FIG. 5A is a diagram formed by adding processing inside the system control unit 121 to FIG. 1, and the functional blocks outside the system control unit 121 are the same as the functional blocks described for FIG. 1. Therefore, the description thereof is omitted.

A shake correction amount calculation unit 201 calculates the drive position of the optical correction system 102 based on the result of the angular velocity detection performed by the angular velocity sensor 120, and sends a drive instruction to the optical correction system drive unit 107. A shake amount calculation unit 202 calculates the amount of shake applied to the image capturing apparatus 100 during the electric charge accumulation period of the image sensor 105, based on the output from the angular velocity sensor 120. A metadata calculation unit 203 calculates image shake metadata, which is to be passed to the metadata generation unit 113, based on the outputs from the shake correction amount calculation unit 201 and the shake amount calculation unit 202.

Figure 6:
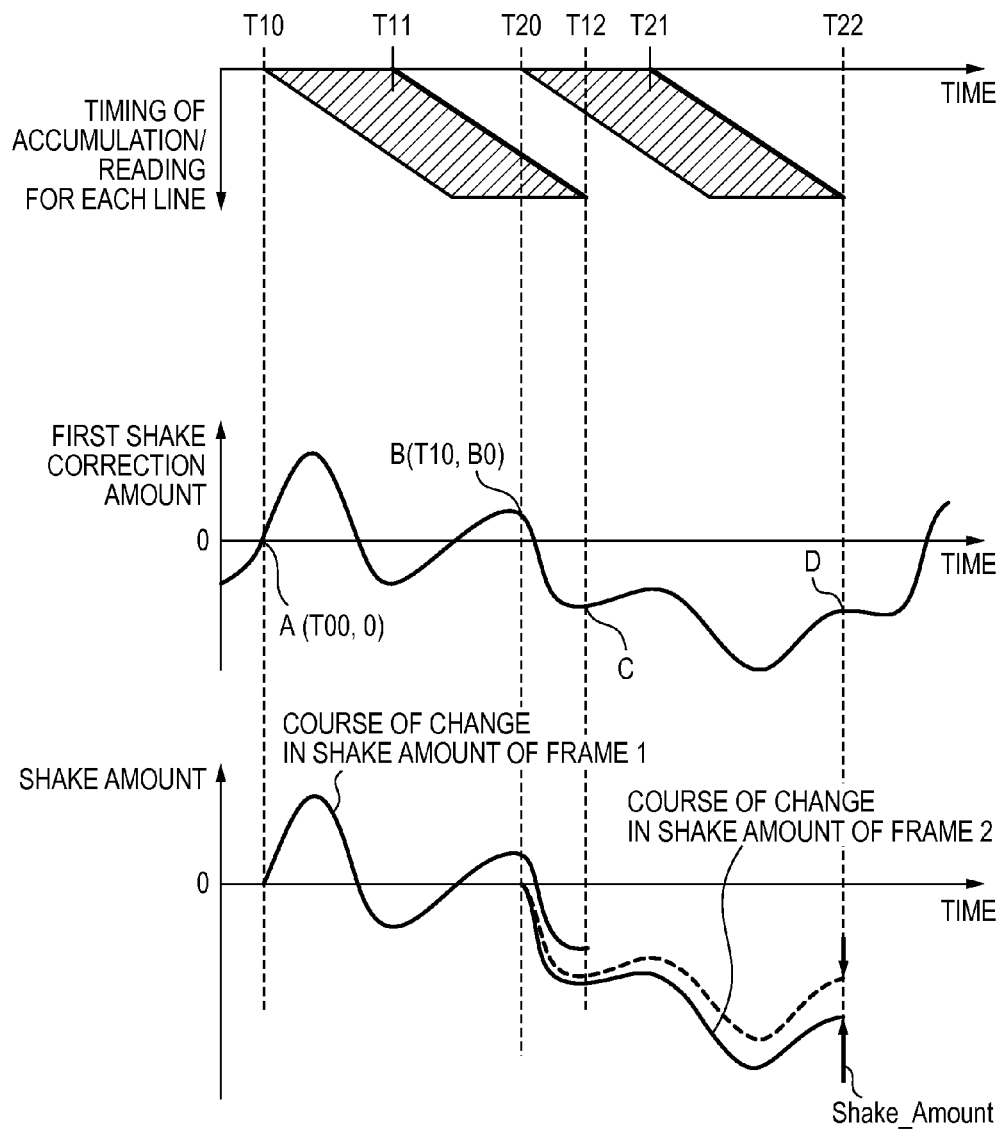
FIG. 6 is diagram illustrating an output from a shake correction amount calculation unit and a shake amount calculation unit.

FIG. 6 is graph illustrating timing of metadata calculation. FIG. 6 is a graph in which the horizontal axis represents the time, and the vertical axis represents the timings of electric charge accumulation and reading for each line of the image sensor 105. FIG. 6 shows operation timings for two frame images. For the clarification of the description, the two frame images are referred to as frame image 1 and frame image 2, where the frame image 1 precedes the frame image 2 in terms of time.

In FIG. 6, the time point T10 shows the timing at which electric charge accumulation starts in the line at one end of the frame 1 of the image sensor 105. The electric charge accumulation sequentially progresses over time towards the line at the other end, as represented by the left side of the diagonally-shaded parallelogram. The time point T11 shows the start timing of reading of the electric charge from the line whose electric charge accumulation started at the time point T10, and the bold line starting from the time point T11 shows the timing with which reading of electric charge from each line is performed. The length of the period between the time points T10 and T11 is the shutter speed. The time point T12 shows the timing with which the electric charge accumulation and reading is completed for all the lines of the frame 1. The time points T20, T21, and T22 respectively show the timings of the start of the electric charge accumulation, the start of the electric charge reading (i.e. the completion of the electric charge accumulation), and the completion of the electric charge reading, with respect to the frame 2 of the image sensor 105.

FIG. 6 is a graph in which the horizontal axis represents the time, and the vertical axis represents the output from the shake correction amount calculation unit 201 converted into the number of moving pixels on the image sensing plane, and this graph shows the change in the number of moving pixels over time. The solid line in FIG. 6 is a graph in which the horizontal axis represents the time, and the vertical axis represents the output from the shake amount calculation unit 202 converted into the number of moving pixels on the image sensing plane, and this graph shows the change in the number of moving pixels over time.

FIG. 6 shows the degree of the image stabilization performed by the optical correction system 102. The solid line in FIG. 6 shows the amount of shake given to the image capturing apparatus 100 during the period from the start of the electric charge accumulation to the end of the electric charge reading for each of the frame 1 and the frame 2. Therefore, the amount of shake of the frame 1 starts changing from the time point T10 and ends changing at the time point T12, and the amount of shake of the frame 2 starts changing from the time point T20 and ends changing at the time point T22. To evaluate the amount of shake of a moving image, it is necessary to calculate the amount of shake occurring between the frame 1 and the frame 2, i.e., the amount of shake occurring during the period from a point between T10 and T12 and a point between T20 and T22. However, since the present embodiment relates to generation of a still image from a frame of a moving image, the amount of shake occurring within the period for generating each frame image is calculated.

By comparing the graphs shown in FIG. 6, it is possible to obtain the accuracy of the correction of the shake given to the image capturing apparatus 100, with respect to the frame 1 and the frame 2. Regarding the frame 1, the course of the change in the shake correction amount from the point A to the point C in FIG. 6 substantially coincides with the course of the change in shake amount of the frame 1 in FIG. 6, and the shake amount at the end of the frame 1 is small. Regarding the frame 2 on the other hand, the course of the change in the shake correction amount from the point B to the point D in FIG. 6 does not coincide with the course of the change in shake amount of the frame 2 in FIG. 6 for the following reasons.

First, the vertical axis coordinate value of the point B is B0, which is not 0 unlike the point A. Therefore, for the comparison with the course of the change in shake amount from the time point T20 in FIG. 6, the value B0 needs to be subtracted from the graph shown in FIG. 6. The result of this subtraction is depicted as a dotted line in FIG. 6. There is a difference between the dotted line and the solid line in FIG. 6. This is for the following reason. In the case of shake correction for a moving image, it will become impossible to perform the shake correction if 100% shake correction is continued until the correction limit, and the state in which the shake correction has been performed and the state in which the shake correction has not been performed will be repeated, which results in an image with poor quality. To avoid such a situation, it is common that control is performed for, for example, changing the cutoff frequency of the low frequency band cutoff filter provided within the shake correction amount calculation unit 201 when the correction limit of the optical correction system 102 is approached, thereby reducing the effect of the shake correction so that the optical correction system 102 can keep operating continuously. On the other hand, regarding the shake correction for a still image, shake correction at the maximum degree, possibly at 100%, during the still image exposure is required, until the correction limit is reached. The difference in the concept of shake correction for a moving image and a still image results in the difference shown in FIG. 6. That is, regarding the frame 2, although it is desired to control the optical correction system 102 according to the course of the solid line in FIG. 6 in the case of shake correction for a still image, the optical correction system 102 is controlled according to the course of the dotted line in the case of shake correction for a moving image. The difference between them is the shake amount of the frame 2.

Figure 7A:
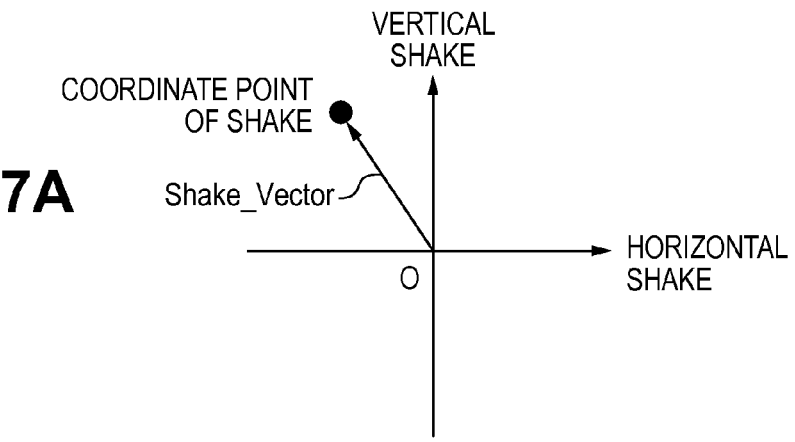
FIGS. 7A to 7C are diagrams illustrating an example of a method of calculating shake metadata.

In the graph shown in FIG. 7A, the horizontal axis represents the amount of horizontal shake of the image sensor 105, and the vertical axis represents the amount of vertical shake of the same (measured in units of pixels). When it is assumed that the graphs shown in FIG. 6 express the shake correction amount and the shake amount in either the horizontal direction or the vertical direction of the image sensor 105, the final shake amount of one of the axes of the frame 2 is Shake_Amount shown in FIG. 6. By calculating the shake amount for both the vertical axis and the horizontal axis, the shake amount of each frame of a moving image can be represented on a two-dimensional coordinate system as shown in FIG. 7A. The vector of the shake on the two-dimensional coordinate system is defined as Shake_Vector. As a matter of course, the closer to the origin the coordinate point of Shake_Vector is, the smaller the shake amount is.

Figure 7B:
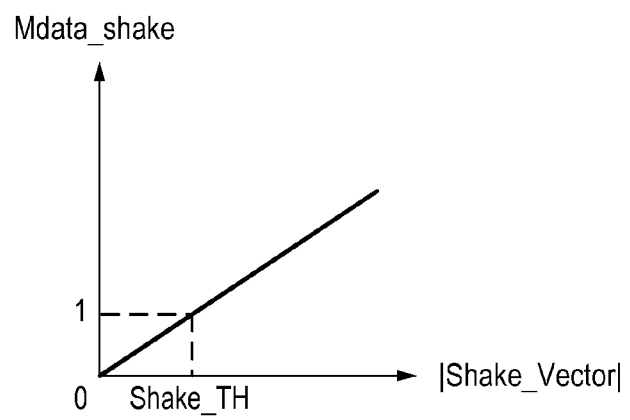
Figure 7C:
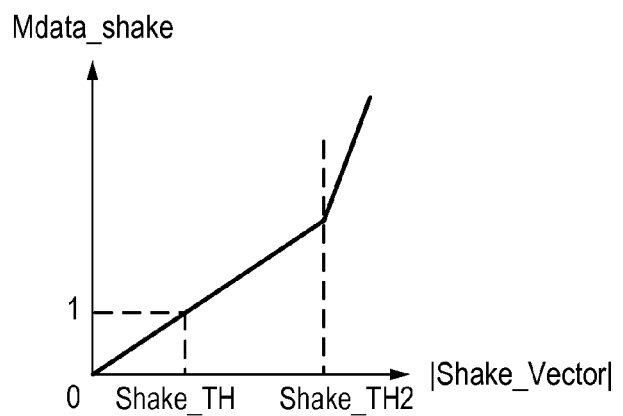

FIG. 7B and FIG. 7C are examples of graphs in which the horizontal axis represents the magnitude of Shake_Vector, and the vertical axis represents the metadata Mdata_shake to be generated. Regarding the horizontal axis, the larger the value is, the larger the shake amount of the image is, as already described above. In FIG. 7B, Mdata_shake is calculated by the following formula:

$$\text{Mdata\_shake} = |\text{Shake\_Vector}|/\text{Shake\_TH}$$

That is, the shake amount on the image sensor 105 is normalized with respect to a predetermined threshold value Shake_TH. Here, Shake_TH is defined as the permissible value of the amount of shake. Since the permissible value of the amount of shake varies widely depending on, for example, the number of pixels on the image sensor 105 and the resolution of the optical image capturing system, it is difficult to fixedly determine the permissible value. However, the permissible value may be defined to be the value of the diameter of the permissible circle of confusion, for example. Alternatively, the permissible value may be set by a user freely. As a result of this calculation, Mdata_shake will be data having the following characteristics: the amount of shake of the image decreases and the degree of the suitability of the image as a still image increases as Mdata_shake approaches 0; and the amount of shake of the image increases as Mdata_shake increases from 1.

FIG. 7C is a graph showing an example of another method of calculating Mdata_shake, in which the horizontal axis and the vertical axis represent the same as in FIG. 7B. In FIG. 7C, Mdata_shake is calculated in the same manner as in FIG. 7B when |Shake_Vector|<Shake_TH2. Otherwise, however, the amount of a change (gain) in Mdata_shake along with a change in |Shake_Vector| is greater than in FIG. 7B. This is for the following reason. A small shake can easily be corrected by known image restoration technology or the like by image processing performed within the image capturing apparatus 100 or performed by using image processing software on a PC, for example. However, when a shake of an image is large, the pseudo contour or the like will be noticeable, and the degree of deterioration in quality of the image as a still image will be significant.

Figure 8A:
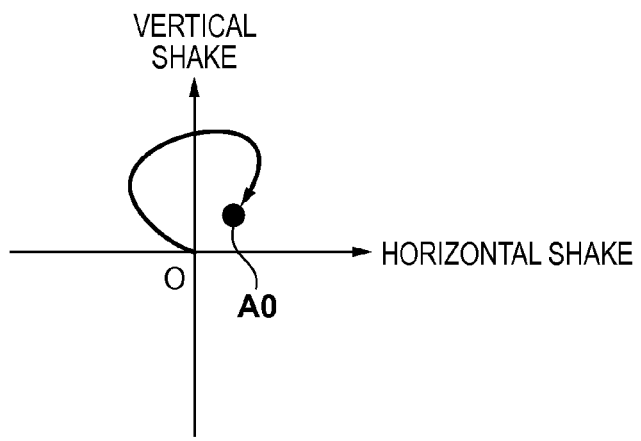
FIGS. 8A to 8C are diagrams illustrating another example of a method of calculating shake metadata.
Figure 8B:
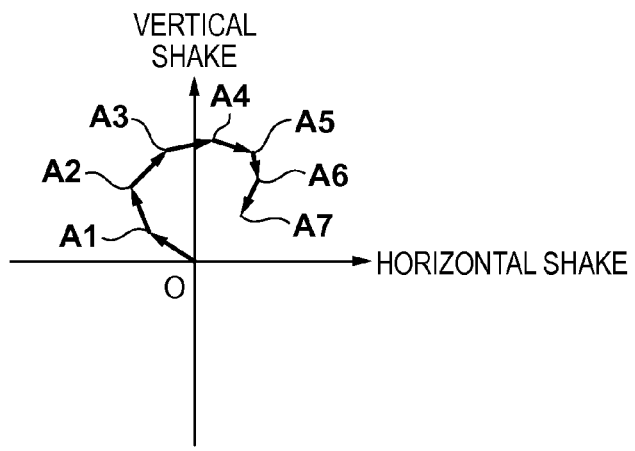
Figure 8C:
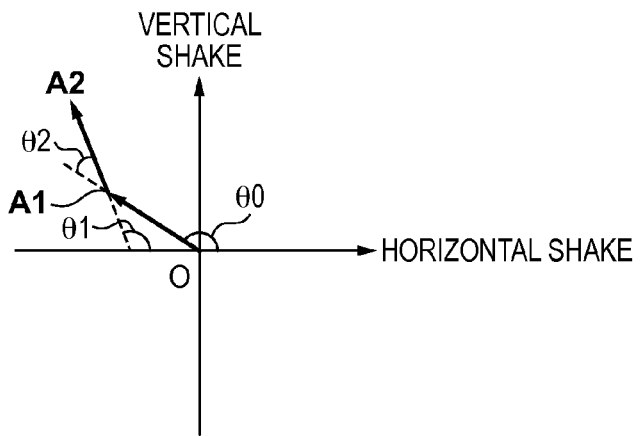

The following provides a description of another method of calculating Mdata_shake with reference to the graphs shown in FIGS. 8A to 8C. In FIGS. 7A to 7C, Mdata_shake is calculated by using the difference, at the completion of the reading of all the electric charge, between the amount of shake correction performed by the shake correction amount calculation unit 201 and the amount of shake detected by the shake amount calculation unit 202. In most cases, the shake amount of each frame of a moving image can be expressed by this calculation method. However, as shown in FIG. 8A, the shake amount cannot be correctly expressed in some cases. FIG. 8A is a graph showing an example of the course of the change in amount of shake on the image sensing plane from the start of the electric charge accumulation to the completion of the electric charge reading with respect to the image sensor 105, in which the horizontal axis and the vertical axis represent the same as in FIG. 7B. In the example shown in FIG. 8A, the point A0 indicates the completion of the reading of all the electric charge, which is close to the origin O. However, the course of the change passes through a coordinate point that is farther from the origin O than the point A0 is. Although the occurrence frequency of such a course of change is very low when the shutter speed is high, the occurrence frequency increases as the shutter speed decreases. When such a course is taken, the shake amount of each frame of a moving image cannot be correctly expressed by the point A0 indicating the completion of the reading of all the electric charge.

In view of this problem, an alternative method of calculating the shake amount using a substitute to the above-described Shake_Amount is described next with reference to FIG. 8B. The graph shown in FIG. 8B is the plot of the course of the change in shake amount shown in FIG. 8A in which points A1 to A7 are taken at predetermined intervals. The formula for calculating the shake amount is as follows:

$$|A1-O|+|A2-A1|+|A3-A2|+|A4-A3|+|A5-A4|+|A6-A5|+|A7-A6| \quad \text{Formula 1}$$

Formula 1 represents the total sum (i.e., the value of integral) of the amounts of shake on the image sensing plane during each of the predetermined intervals from the start of accumulation of the electric charge to the completion of the reading of all the electric charge. Formula 1 allows for calculation of the entire distance of the course of the change in the shake amount, and it can avoid the problem that the shake amount of each frame of a moving image cannot be correctly expressed. Note that, in FIG. 7B and in FIG. 7C, Mdata_shake can be calculated by replacing the result of the calculation by Formula 1 with |Shake_Vector|.

The following describes another example of a method of calculating a shake amount as a substitute for the above-described Shake_Amount, with reference to FIG. 8C. FIG. 8C is a graph in which the course of change in shake amount from the origin O to the point A2 in FIG. 8B is magnified. As shown in the drawing, when θ0 denotes the angle formed by the horizontal axis and the vector A1-O, θ1 denotes the angle formed by the horizontal axis and the vector A2-A1, and θ2 denotes the relative angle between the vector A1-O and the vector A2-A1, θ2=θ0−θ1 is satisfied. When the course of the vector of the shake amount on the image plane is similar to a straight line, an image without shake can be relatively easily restored by image processing performed within the image capturing apparatus 100 or performed by using image processing software on a PC, for example. However, the more complex the course is, the more difficult the restoration is. The data taking into consideration the difficulty in restoration can be formed by performing processing for multiplication by a gain that increases as the angular change θ2 of the difference vector increases when calculating the total sum of the amounts of shake on the image sensing plane per predetermined time (i.e., per unit time). For example, at the addition of |A2-A1| to |A1-O|, the following calculation may be performed:

$$|A1-O|+|A2-A1|(1+\sin\theta2)$$

According to this formula, sin θ2=0 when θ2 is 0 degree, and sin θ2=1 when θ2 is 90 degrees. Thus a gain can be set according to the magnitude of θ2. It is possible to obtain Mdata_shake taking into consideration the easiness of the restoration of shake by performing this calculation from the start of the accumulation of the electric charge to the completion of the reading of all the electric charge and replacing |Shake_Vector| in FIG. 7B or FIG. 7C with the result of this calculation.

The following provides a description of another example of a method of calculating Mdata_shake. FIG. 5B is an example of a block diagram for generating shake metadata. FIG. 5B is a diagram formed by adding functional blocks 301 to 303 to FIG. 5A, and therefore the description of the other functional blocks is omitted.

A motion vector detection unit 303 detects a motion vector in an image, based on the luminance signal contained in the current image signal generated by the signal processing unit 111 and the luminance signal the image signal of the previous frame stored in the image memory inside the motion vector detection unit 303. The motion vector detected by the motion vector detection unit 303 is output to a panning detection unit 301 and a panning speed calculation unit 302. Note that the motion vector detection unit 303 is not an essential component.

The panning detection unit 301 determines whether or not the image capturing apparatus 100 is in the panning state, based on the output from the angular velocity sensor 120 or the motion vector detection unit 303. The panning speed calculation unit 302 calculates the current panning speed when the panning detection unit 301 determines that the image capturing apparatus 100 is in the panning state, and outputs the panning speed to the shake amount calculation unit 202. When it is determined that the image capturing apparatus 100 is not in the panning state, the panning speed is set to 0. The calculation of the panning speed is performed based on either one or both of the output from the angular velocity sensor 120 and the output from the motion vector detection unit 303. The shake correction amount calculation unit 202 performs calculation of the shake amount taking into consideration the panning speed calculated by the panning speed calculation unit 302.

During moving image capturing, panning operations occur frequently unlike during still image capturing. In the case where the main object is moving, capturing is often performed such that main object remains close to the center point of the screen. In such a case, if only the above-described method of normalizing the amount of shake on the image sensing plane and holding the result as metadata is used, the data always indicates a large amount of shake during the period for which panning is performed. When panning is performed during moving image capturing in synchronization with the motion of the main object, it is not desirable that all the frame images during the panning are determined to contain a large amount of shake, because the situation is the same as with panning performed during still image capturing.

For this reason, the panning detection unit 301 first determines whether or not the image capturing apparatus 100 is in the panning state. A known technology may be used for the determination as to the panning. For example, there is a method of determining that panning is being performed, when the output from the angular velocity sensor 120, or the output from the motion vector detection unit 303, or the total sum of these outputs (i.e., the integral value) exceeds a predetermined value.

The panning speed calculation unit 302 calculates the panning speed. The panning speed can be obtained by averaging the output from the angular velocity sensor 120. Alternatively, the output from the motion vector detection unit 303 may be used. The following describes the calculation of the panning speed using the output from the motion vector detection unit 303, with reference to FIGS. 9A and 9B. FIG. 9A shows an image that is being captured such that a vehicle moving at the center of the screen is kept at the center of the screen. It is assumed that a block matching method is used for motion vector detection, by which the image is divided into a plurality of blocks and a motion vector is calculated for each block. The dotted lines define the blocks in each of which motion vector detection is performed.

In FIG. 9B, the result of the motion vector detection performed in each block is represented by the direction and magnitude of an arrow. The motion vectors within the box in bold are the motion vectors of the vehicle, and the motion vectors outside the box in bold are the motion vectors of the background area excluding the vehicle. When Vector_Back denotes the average value of the motion vectors of the background area, and Vector_Car denotes the average value of the motion vectors of the vehicle area, the panning speed can be calculated by Vector_Back−Vector_Car. The formula above is for calculating the panning speed that cancels out the motion vectors of the vehicle area to be zero. If the motion vectors of the vehicle area are zero, it means that the capturing follows the motion of the vehicle with 100% synchronization, and it can be said that almost ideal panning is being performed.

Figure 10A:
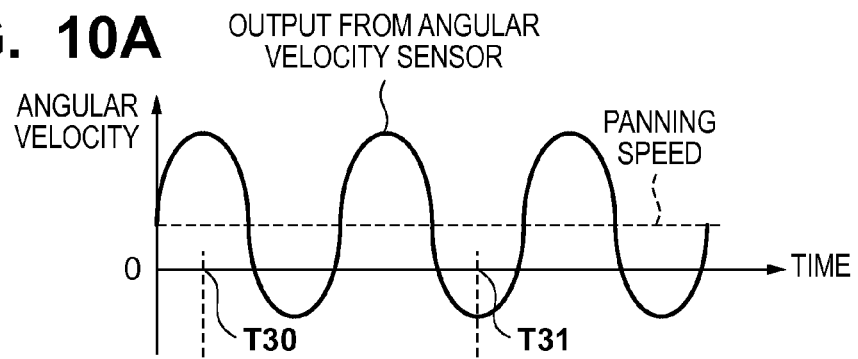
FIGS. 10A to 10C are diagrams illustrating a calculation performed by the shake amount calculation unit, taking the panning speed into consideration.
Figure 10B:
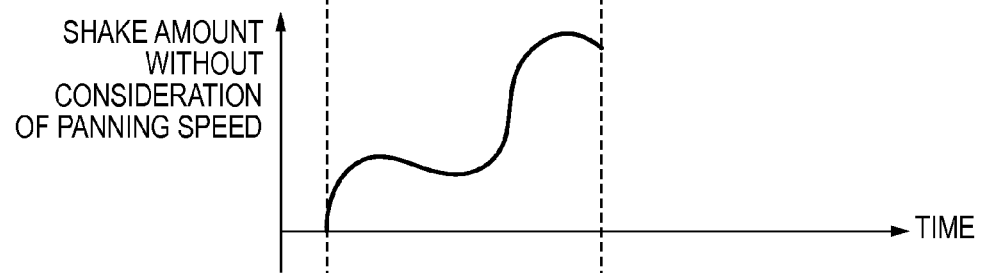
Figure 10C:
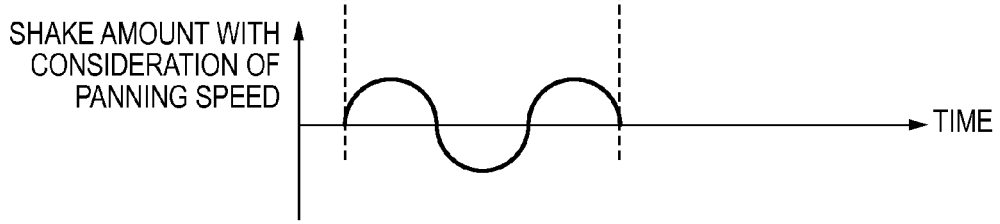

With reference to FIGS. 10A to 10C, the following describes the shake amount calculation performed by the shake amount calculation unit 202 shown in FIG. 5B, taking the panning speed into consideration. FIG. 10A is a graph that shows the output from the angular velocity sensor 120 (in bold line) and the panning speed calculated by the panning speed calculation unit 302 (in dotted line), in which the horizontal axis represents the time, and the horizontal axis represents the angular velocity. FIG. 10A shows a graph when the image capturing apparatus 100 is being panned, in which the output of the angular velocity sensor 120 has a waveform formed by superimposing an angular velocity signal having a high frequency onto the panning speed.

Here, it is assumed that the time point T30 indicates the timing of the start of the electric charge accumulation by the image sensor 105, and the time point T31 indicates the timing of the completion of the reading of all the electric charge. In this case, if the shake amount is calculated by the method described with reference to FIG. 6, which does not take the panning speed into consideration, the result will be the graph shown in FIG. 10B. Since FIG. 10A is a graph showing the case where the panning speed always exists, when the shake amount is calculated by integration of this graph, the motion of the image capturing apparatus 100 is also integrated, and the result will be a very large amount as shown in FIG. 10B. Since the optical correction system 102 usually performs control so as not to correct the panning motion, the metadata Mdata_shake, which is calculated based on the difference between the shake amount shown in FIG. 10B and the output from the shake correction amount calculation unit 201, will have a large value as well.

In contrast, FIG. 10C is a graph showing the shake amount calculated by integrating the result of subtraction of the panning speed from the output of the angular velocity sensor 120. FIG. 10C shows the shake amount from which the panning motion component is excluded. Since the optical correction system 102 usually performs control so as not to correct the panning motion, the shake amount shown in FIG. 10C and the output from the shake correction amount calculation unit 201 will be similar, and accordingly the metadata Mdata_shake, which is calculated based on the difference between them, will have a small value.

As a result, it becomes possible to avoid the occurrence of the phenomenon in which, when the user performs panning, Mdata_shake always has a large value and the shake is determined to be large. Note that when there is no main object, and only scenery is captured by panning, the case is different from the above-described panning for still image capturing, and each frame image simply shows the scenery with a blur. In such a case, the panning detection unit 301 can determine that the shake is not the result of panning, and thereby avoid the occurrence of the phenomenon in which a large shake in an image is determined to be small. This determination can be achieved by using the motion vectors described in FIG. 9A and FIG. 9B. For example, when all the motion vectors within the screen point in the same direction, the image can be determined to be not an image captured by panning performed for following the motion of the main object.

So far, the description has been made on the assumption that there is a mechanism for driving the optical correction system 102 and the image sensor 105. In the case of an image capturing apparatus without such a means for optically correcting the shake, the shake correction amount calculation unit 201 is not included in the configurations shown in FIG. 5A and FIG. 5B. Therefore, in such a case, the calculation of the Mdata_shake is performed by using only the output from the shake amount calculation unit 202, and the other calculation methods are the same as in the case where there is a means for optically correcting the shake.

Next, a description is given of an example of a method for using the above-described four types of metadata, namely Mdata_focus, Mdata_exposure, Mdata_wb, and Mdata_shake, by which the user is allowed to select the most appropriate still image from among the frames of a moving image.

FIG. 11 shows a flowchart showing the process by which the user generates a still image from moving image data. Step S100 is a user operation, and the process shown by this flowchart is started when the user operates an operation member (not shown in the drawing) of the image capturing apparatus 100, sets a mode for generating a still image from a captured moving image, and selects a moving image used for generating a still image. At step S101, the system control unit 121 reads the metadata of all the frames of the moving image selected at step S100. At step S102, an assist function for assisting the user to select the most appropriate still image, by using the metadata read at step S101. Step S103 is a user operation, and the user determines the frame to be used for generating a still image, by using the function of step S102. At step S104, decoding for generating one still image from the frame image determined by the user at step S103, and encoding for compressing the decoded image by the JPEG technology. At step S105, the still image generated at step S104 is recorded on the recording medium 114. After the processing at step S105, the processing by this flowchart ends.

Figure 12:
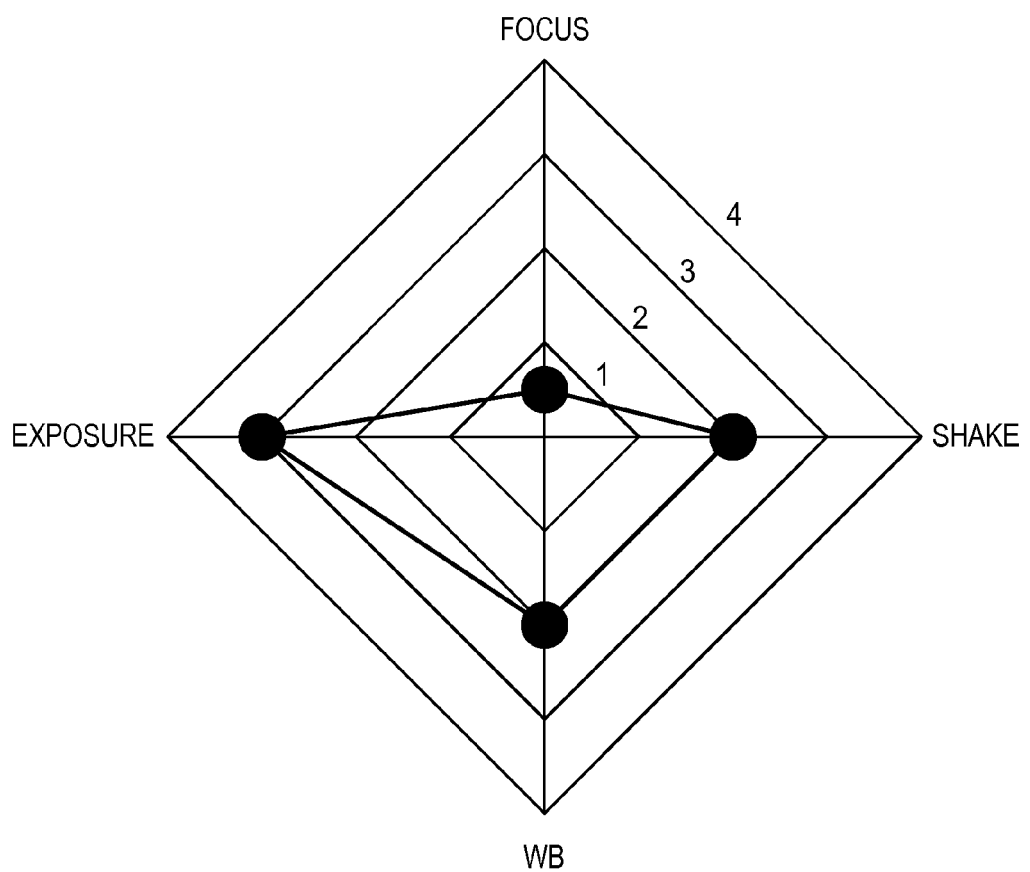
FIG. 12 is a diagram showing an example of a display for notifying a user of the degree of suitability of a frame as a still image.

Examples of the assist function at step S102 are shown below. The simplest example is, as shown in FIG. 12, a method of displaying the values of Mdata_focus, Mdata_exposure, Mdata_wb, and Mdata_shake in a diamond-shaped graph on the display device 112 at the same time as playing back the moving image. The user can select the frame that is the most suitable as a still image by selecting, during the playback of the moving image, a frame image of which all the numeric values are arranged close to the innermost diamond.

There is another method by which the image capturing apparatus 100 automatically selects an image whose evaluation score indicated by the pieces of metadata is high. In addition, it is possible to display frame images in descending order of the evaluation scores on the display device 112 so that the user can preferentially select a frame image with a high evaluation score, or add a colored outline to a frame image with a high evaluation score to highlight the frame image. If frame images having a high evaluation score occur consecutively, similar images will be extracted. To avoid such a situation, a known technology for scene switching detection may be used to select one frame image per scene. Furthermore, by using a known technology for human face recognition, an image having a high evaluation score indicated by the pieces of metadata may be automatically selected from among images capturing a specific person's face.

Here, a description is given of an example of a method for determining the final evaluation score based on the four pieces of metadata. The simplest example is to use the sum of the values of the four pieces of metadata, namely Mdata_focus, Mdata_exposure, Mdata_wb, and Mdata_shake. A value closer to 0 indicates a higher evaluation score, and the evaluation score decreases as the value increases. Alternatively, the values of the four pieces of metadata may be multiplied with each other. A value smaller than 1 by a larger amount indicates a higher evaluation score, and the evaluation score decreases according to increase in the value. Alternatively, the user may be allowed to determine the weighting. For example, there is the possibility that the user intentionally differs the exposure from the optimum value, or intentionally changes the color. Considering such a possibility, the deviation of the exposure from the optimum exposure may be excluded from the evaluation, and the value of Mdata_wb multiplied by a coefficient that is smaller than 1 may be used for evaluation of WB, for example.

In this way, by using the four pieces of metadata in various manners, it is possible to provide various systems that allow the user to easily select the image that is the most suitable as a still image from among the frames of a moving image.

As described above, regarding the four types of camera parameters indicating the deviation of the focus, the deviation of the exposure, the deviation of the WB, and shake, which are used as metadata for determining whether or not an image is suitable as a still image, the present embodiment shows the most preferable calculation method taking into consideration the characteristics of each parameter. Furthermore, regarding the four types of camera parameters, the amount of deviation from the permissible value is normalized with respect to the permissible value for each of the frames during moving image capturing, and records the results in association with each frame of the moving image. As a result, it becomes possible to evaluate these four types of parameters by the same standard and to notify the user of which frame image is the most suitable as a still image. Consequently, the user can easily generate the most appropriate still image from a moving image.

Although the present invention has been described based on preferred embodiments thereof, the present invention is not intended to be limited to the specific embodiments, and variations that do not depart from the essential spirit of the invention are intended to be included in the scope of the present invention. For example, it is not essential to generate all the four types of parameters, and the present invention may be a system that uses at least one of the parameters.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-133246, filed Jun. 27, 2014, which is hereby incorporated by reference herein in its entirety.

What is claimed is:

1. An image processing apparatus comprising:
a first calculation unit configured to calculate a shake correction amount for a moving image by using a shake signal output from a shake detection unit;
a second calculation unit configured to calculate a shake correction amount for a still image achieving a higher anti-shake performance than the shake correction amount for the moving image by using a shake signal output from the shake detection unit;
a generation unit configured to generate, based on a difference between the shake correction amount for the moving image and the shake correction amount for the still image, evaluation values indicating amount of shake on image sensing plane of an image sensor; and
a recording unit configured to record the evaluation values in association with frame images of the moving image,
wherein the generation unit changes a display form for displaying information on the evaluation value in association with the frame image of the moving image in accordance with the amount of shake.

2. The image processing apparatus according to claim 1, further comprising a control unit configured to control an optical shake correction unit by using the shake correction amount for the moving image.

3. The image processing apparatus according to claim 1, wherein the generation unit defines an amount of shake of each of the frame images as an integrated value of a difference per unit time between the shake correction amount for the moving image and the shake correction amount for the still image, and calculates the amount of shake of each of the frame images such that the integrated value increases as a change in angle of a vector of the difference per unit time between the shake correction amount for the moving image and the shake correction amount for the still image increases.

4. The image processing apparatus according to claim 1, further comprising a determination unit configured to determine whether or not panning is being performed,
wherein when the determination unit determines that panning is being performed, the generation unit calculates a panning speed based on an output from the shake detection unit, and obtains data indicating the amount of shake of each of the frame images by subtracting a motion amount of the panning from the shake correction amount for the moving image and the shake correction amount for the still image.

5. A method for controlling an image processing apparatus, comprising:
a first calculation step of calculating a shake correction amount for a moving image by using a shake signal output from a shake detection unit;
a second calculation step of calculating a shake correction amount for a still image achieving a higher anti-shake performance than the shake correction amount for the moving image by using a shake signal output from the shake detection unit;
a generation step of generating, based on a difference between the shake correction amount for the moving image and the shake correction amount for the still image, evaluation values indicating amount of shake on image sensing plane of an image sensor; and
a recording step of recording the evaluation values in association with frame images of the moving image,
wherein the generation step changes a display form for displaying information on the evaluation value in association with the frame image of the moving image in accordance with the amount of shake.

6. A non-transitory computer-readable storage medium storing therein a program for causing a computer to perform the steps of the method according to claim 5.

* * * * *